US012802963B2

(12) United States Patent
Uezono et al.

(10) Patent No.: US 12,802,963 B2
(45) Date of Patent: Nov. 17, 2026

(54) METHOD OF PRODUCING ELECTRODE, AND ELECTRODE PRODUCTION APPARATUS

(71) Applicant: TOYOTA JIDOSHA KABUSHIKI KAISHA, Toyota (JP)

(72) Inventors: Tomoyuki Uezono, Toyota (JP); Momoka Oda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1020 days.

(21) Appl. No.: 17/860,560

(22) Filed: Jul. 8, 2022

(65) Prior Publication Data

US 2023/0027943 A1 Jan. 26, 2023

(30) Foreign Application Priority Data

Jul. 21, 2021 (JP) ................................ 2021-120372

(51) Int. Cl.
*H01M 4/04* (2006.01)
*H01M 4/62* (2006.01)

(52) U.S. Cl.
CPC ....... *H01M 4/0435* (2013.01); *H01M 4/0469* (2013.01); *H01M 4/623* (2013.01)

(58) Field of Classification Search
CPC ....... B05D 1/007; B05D 3/14; H01M 4/0435; H01M 4/0409; H01M 4/0404; H01M 4/0469; B05C 9/12; B05B 5/081
USPC .......................................................... 429/209
See application file for complete search history.

(56) References Cited

U.S. PATENT DOCUMENTS

| | | | | |
|---|---|---|---|---|
| 2005/0287306 | A1* | 12/2005 | Hays | B05B 5/081 427/458 |
| 2016/0240859 | A1* | 8/2016 | Uezono | H01M 4/0435 |
| 2016/0279667 | A1* | 9/2016 | Noda | G03G 15/346 |
| 2020/0185782 | A1* | 6/2020 | Tanaka | H01M 4/70 |
| 2020/0295353 | A1 | 9/2020 | Tanaka | |
| 2023/0138078 | A1* | 5/2023 | Isshiki | H01M 10/0525 429/231.95 |

FOREIGN PATENT DOCUMENTS

| | | | |
|---|---|---|---|
| CN | 106000805 | A | 10/2016 |
| JP | 2002367616 | A * | 12/2002 |
| JP | 2011-049231 | A | 3/2011 |
| JP | 2016-182579 | A | 10/2016 |
| JP | 2020-149862 | A | 9/2020 |
| JP | 2021-082396 | A | 5/2021 |

OTHER PUBLICATIONS

JP-2002367616-A (machine translation) (Year: 2002).*

* cited by examiner

*Primary Examiner* — Tiffany Legette
*Assistant Examiner* — Paul Christian St Wyrough
(74) *Attorney, Agent, or Firm* — Oliff PLC

(57) ABSTRACT

Granules including an active material powder and a binder are prepared. The granules are supplied onto a surface of a roller. The granules are electrically charged. The granules are transferred from a first region to a second region by way of rotation of the roller. A first electric field is formed between the second region and a third region to allow the granules to fly from the second region toward the third region. A second electric field is formed between the third region and a substrate to allow the granules to fly from the third region toward the substrate.

7 Claims, 7 Drawing Sheets

METHOD OF PRODUCING ELECTRODE, AND ELECTRODE PRODUCTION APPARATUS

This nonprovisional application is based on Japanese Patent Application No. 2021-120372 filed on Jul. 21, 2021, with the Japan Patent Office, the entire contents of which are hereby incorporated by reference.

BACKGROUND

Field

The present disclosure relates to a method of producing an electrode, and to an electrode production apparatus.

Description of the Background Art

Japanese Patent Laying-Open No. 2020-149862 discloses a manufacturing method of electrode sheet.

SUMMARY

An electrode includes a substrate and an active material layer. The active material layer may be formed by applying powder (an electrode material) to a surface of the substrate.

A method for producing an electrode by electrostatic coating is suggested. It is expected that electrostatic coating can form an active material layer having a uniform composition. Further, for enhanced productivity, a roller-to-roller method may be employed to perform electrostatic coating.

For employing a roller-to-roller method for electrostatic coating, use of a magnetic roller can be considered, for example. More specifically, powder is adsorbed on the surface of the magnetic roller due to magnetic force; the substrate is supported on a backup roller; an electric field is formed in the gap between the magnetic roller and the backup roller; electrostatic force acts on the powder present in the electric field; the electric field strength is adjusted so that the electrostatic force can overcome the magnetic force; due to the electrostatic force, the powder leaves the magnetic roller; the powder flies toward the substrate; the powder adheres to the substrate; thus, an active material layer may be formed; that is, an electrode may be produced. The rotation of the rollers allows for continuous electrode production.

When the electrode material is not magnetic, a magnetic carrier (magnetic particles) may be used. More specifically, the electrode material and the magnetic particles are mixed to allow the electrode material to adhere to the magnetic particles; the magnetic particles are adsorbed onto the magnetic roller due to magnetic force; and thus, the electrode material may become supported on the magnetic roller.

However, the adhering force between the electrode material and the magnetic particles tends to vary in a great extent. When the adhering force is too strong, the electrode material may not leave the magnetic particles even under the action of electrostatic force. As a result, nonuniform coating may occur.

An object of the present disclosure is to reduce nonuniformity in coating.

Hereinafter, the technical configuration and effects of the present disclosure will be described. It should be noted that the action mechanism according to the present specification includes presumption. The action mechanism does not limit the technical scope of the present disclosure.

1. A method of producing an electrode includes the following (a) to (f):

(a) preparing granules, the granules including an active material powder and a binder;
(b) supplying the granules onto a surface of a roller;
(c) electrically charging the granules;
(d) transferring the granules from a first region to a second region by way of rotation of the roller;
(e) forming a first electric field between the second region and a third region to allow the granules to fly from the second region toward the third region; and
(f) forming a second electric field between the third region and a substrate to allow the granules to fly from the third region toward the substrate.

The second region is positioned lower in a vertical direction than the first region. The third region is positioned away from the second region in a direction crossing the vertical direction. The substrate is positioned lower in the vertical direction than the third region. The granules adhere to the substrate and thereby an active material layer is formed.

When attempting to transfer powder (an electrode material) without relying on magnetic force, it is difficult to transfer the powder in a direction against gravity. This is because the powder can fall from the roller due to gravity. Therefore, when powder is transferred without relying on magnetic force, the powder is to be transferred from a higher position to a lower position in a vertical direction.

FIG. 1 is a conceptual view illustrating an electrode production apparatus according to a first reference embodiment. In the first reference embodiment, powder is transferred from a higher position to a lower position in the vertical direction (in the Z-axis direction). Further, in the first reference embodiment, electrostatic coating (powder flying) is performed in a vertically downward direction.

A backup roller 212 is adjacent to a supply roller 211 in the vertical direction. Backup roller 212 is positioned lower than supply roller 211. Supply roller 211 transfers a powder 1 to a gap between supply roller 211 and backup roller 212. Backup roller 212 transfers a substrate 13 to the gap between supply roller 211 and backup roller 212. In the gap between supply roller 211 and backup roller 212, electrostatic coating is performed. However, before powder 1 reaches the gap between supply roller 211 and backup roller 212, powder 1 may fall from supply roller 211 due to gravity. Therefore, in the first reference embodiment, nonuniform coating and yield loss may occur.

FIG. 2 is a conceptual view illustrating an electrode production apparatus according to a second reference embodiment. Also in the second reference embodiment, powder is transferred from a higher position to a lower position in the vertical direction (in the Z-axis direction). Further, in the second reference embodiment, electrostatic coating (powder flying) is performed in a horizontal direction (in the X-axis direction).

A supply roller 221 transfers powder 1. Powder 1 is transferred in such a manner that it is less likely to fall due to gravity. A backup roller 222 is adjacent to supply roller 221 in the horizontal direction. In the gap between supply roller 221 and backup roller 222, electrostatic coating is performed. However, part of powder 1 that has reached substrate 13 cannot adhere to substrate 13 and may fall due to gravity. Therefore, also in the second reference embodiment, nonuniform coating and yield loss may occur.

FIG. 3 is a conceptual view illustrating an electrode production apparatus according to the present embodiment. A coating material according to the present disclosure is granules 11. Granules 11 may be prepared by granulation of powder. Granules 11 may also be called "a granulated body". Ordinary powder has a low fluidity, and therefore the particles are likely to aggregate while they are being transferred. When the particles aggregate, they tend not to fly even under the action of electrostatic force. Granules 11 may be more fluid than powder. It is expected that granules 11 are likely to fly due to electrostatic force.

In the present disclosure, two-step electrostatic coating (powder flying) is performed. A first roller 110 transfers granules 11. Granules 11 are transferred from a first region R1 to a second region R2. Granules 11 are transferred in such a manner that they are less likely to fall due to gravity. Thus, falling of granules 11 due to gravity before electrostatic coating may be reduced. That is, yield loss may be reduced.

FIG. 4 is a conceptual view illustrating electrostatic coating according to the present embodiment. A third region R3 is positioned away from second region R2 in a direction crossing the vertical direction. A first electrostatic coating is performed in a direction crossing the vertical direction. More specifically, a first electric field E1 is formed between second region R2 and third region R3, and thereby a first electrostatic force F1 acts on granules 11. Due to first electrostatic force F1, granules 11 fly from second region R2 toward third region R3.

Further, a second electrostatic coating is performed in the vertical direction. More specifically, a second electric field E2 is formed between third region R3 and substrate 13, and thereby a second electrostatic force F2 acts on granules 11 that have moved to third region R3. Due to second electrostatic force F2, granules 11 fly from third region R3 toward substrate 13. Flying granules 11 receive not only the action of second electrostatic force F2 but also the action of gravity F3. This is because substrate 13 is positioned lower in the vertical direction than third region R3. It is expected that the combined action of second electrostatic force F2 and gravity F3 on flying granules 11 can make granules 11 adhere to substrate 13 firmly. This synergistic action is expected to reduce nonuniformity in coating in the present disclosure.

2. The granules may have a solid fraction from 70 to 100% by mass, for example.

The "solid fraction" refers to the mass fraction of components other than a solvent relative to the entire mixture. The granules are prepared by granulation of an active material powder and a binder. The granules may be in a dry state. The granules may be in a wet state; that is, the granules may include solvent (liquid). However, the granules are different from a slurry (a particle dispersion). In the granules, the solvent forms droplets. In the granules, the solvent (liquid) is dispersed in a powdery and granular material (solid). On the other hand, in a slurry, solvent is a dispersion medium. In a slurry, a powdery and granular material (a solid) is dispersed in the solvent (liquid). The slurry may have a solid fraction of 60% or less, for example.

Conventionally, an electrode is generally produced by slurry application. However in a conventional method, a considerable amount of solvent may be used. In the present disclosure, solvent usage may be reduced. With the reduced solvent usage, production costs and environmental burdens are expected to be reduced, for example.

3. The granules may have a D50 from 100 to 200 μm, for example.

When the granules have a D50 from 100 to 200 μm, the granules are expected to have a preferable fluidity, for example.

4. The granules may have an angle of repose of 50° or less, for example.

The angle of repose is an index of the fluidity of the powdery and granular material. A smaller angle of repose is regarded as indicating a higher fluidity of the powdery and granular material. Granulation of powder may decrease the angle of repose. When the granules have an angle of repose of 50° or less, nonuniformity in coating is expected to be reduced, for example.

5. The first electric field has a first electric field strength. The second electric field has a second electric field strength. For example, the second electric field strength may be smaller than the first electric field strength.

The first electric field strength may be changed in order to adjust the first electrostatic force. The second electric field strength may be changed in order to adjust the second electrostatic force. In the second electrostatic coating, not only the second electrostatic force but also gravity act on the granules. For this reason, the second electric field strength may be set smaller than the first electric field strength, for example.

6. The above (d) may include spreading the granules evenly on the surface of a roller, for example.

Spreading the granules evenly on the surface of a roller may reduce variations in the supply amount of the granules. By this, nonuniformity in coating is expected to be reduced, for example.

7. The method of producing an electrode may further include the following (g) and the like, for example:

(g) fixing the active material layer to the substrate by applying at least one of pressure and heat to the active material layer.

The above (g) is expected to enhance the peel strength of the active material layer, for example.

8. An electrode production apparatus produces an electrode by making granules adhere to a substrate, where the granules include an active material powder and a binder. The electrode production apparatus includes a first roller, a relay plate, a second roller, and an electric-field-forming apparatus.

The relay plate is positioned away from the first roller in a direction crossing the vertical direction. The second roller is positioned lower in the vertical direction than both the first roller and the relay plate. The electric-field-forming apparatus is to form a first electric field between the first roller and the relay plate and to form a second electric field between the relay plate and the second roller. The first roller is to transfer the granules into the first electric field. The second roller is to transfer the substrate into the second electric field.

The electrode production apparatus according to the above item 8 allows the granules to fly across the first electric field and then across the second electric field to reach the substrate; that is, it allows for implementation of the method of producing an electrode according to the above item 1.

9. The electrode production apparatus may further include a third roller, for example. The electrode production apparatus may be to spread the granules evenly in a gap between the first roller and the third roller before the granules reach the first electric field.

The electrode production apparatus according to the above item 9 allows for implementation of the method of producing an electrode according to the above item 6.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
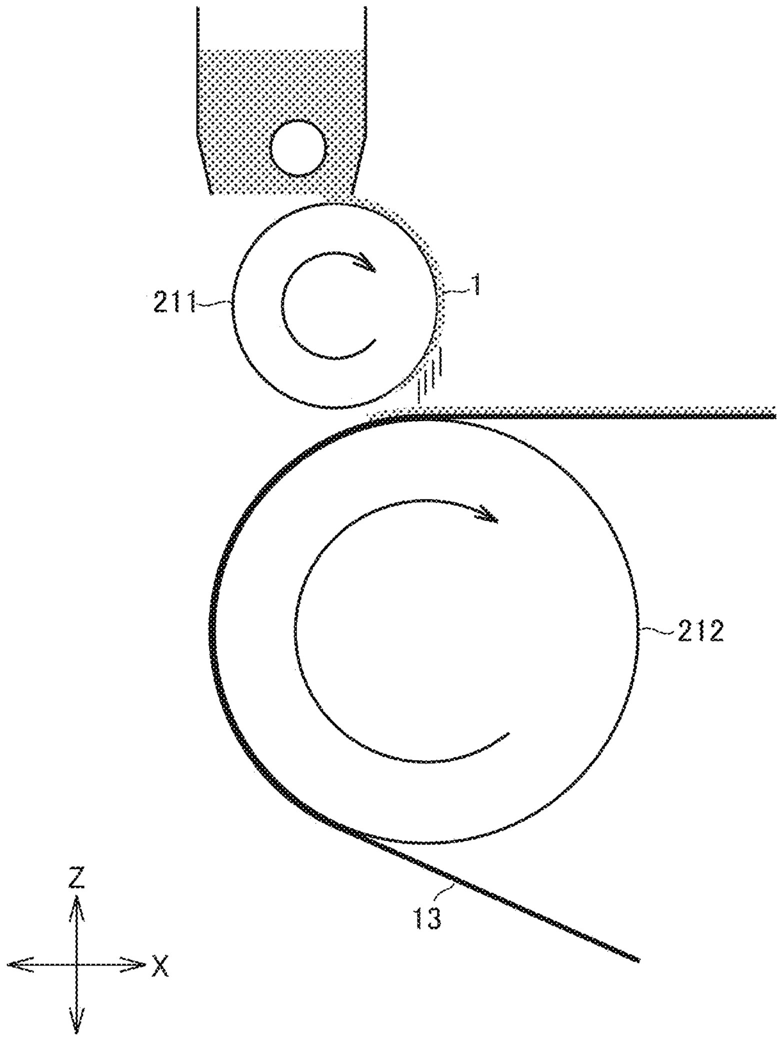
FIG. 1 is a conceptual view illustrating an electrode production apparatus according to a first reference embodiment.
Figure 2:
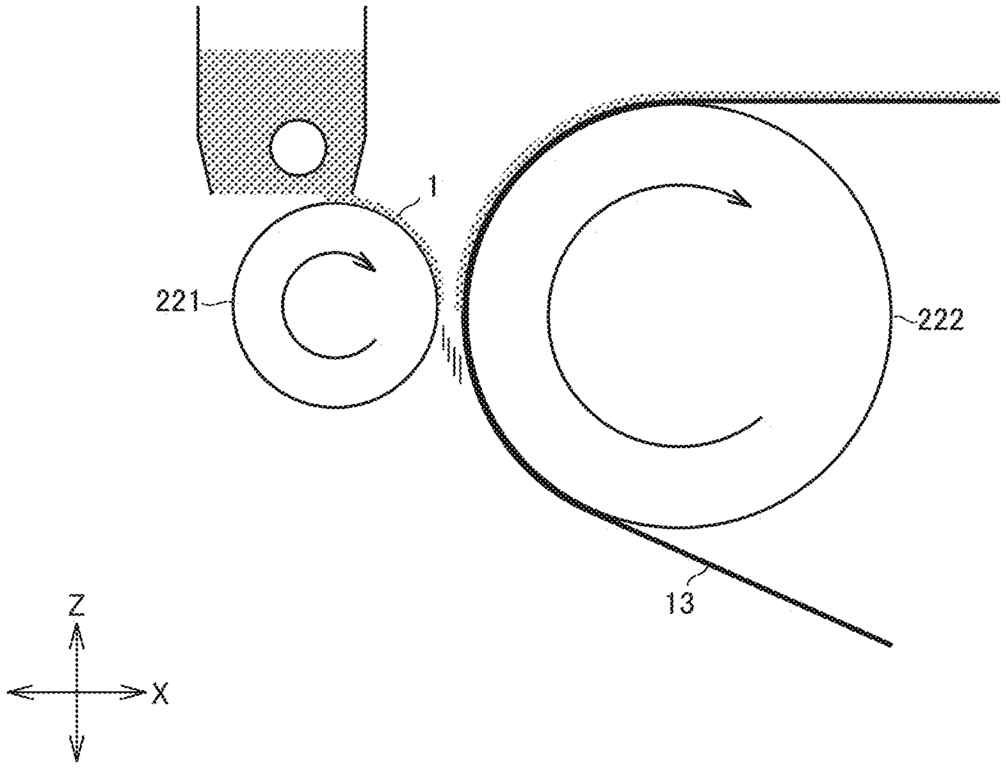
FIG. 2 is a conceptual view illustrating an electrode production apparatus according to a second reference embodiment.

Definitions of Terms, Etc.

Next, an embodiment of the present disclosure (which may also be simply called "the present embodiment" herein) and an example of the present disclosure (which may also be simply called "the present example" herein) will be described. It should be noted that neither the present embodiment nor the present example limits the technical scope of the present disclosure.

Herein, expressions such as "comprise", "include", and "have", and other similar expressions (such as "be composed of", for example) are open-ended expressions. In an open-ended expression, in addition to an essential component, an additional component may or may not be further included. The expression "consist of" is a closed-end expression. However, even when a closed-end expression is used, impurities present under ordinary circumstances as well as an additional element irrelevant to the technique according to the present disclosure are not excluded. The expression "consist essentially of" is a semiclosed-end expression. A semiclosed-end expression tolerates addition of an element that does not substantially affect the fundamental, novel features of the technique according to the present disclosure.

Herein, expressions such as "may" and "can" are not intended to mean "must" (obligation) but rather mean "there is a possibility" (tolerance).

Herein, a singular form also includes its plural meaning, unless otherwise specified. For example, "a particle" may mean not only "one particle" but also "a group of particles".

In the method described in the present specification, the order for implementing a plurality of steps, operations, processes, and the like is not limited to the described order, unless otherwise specified. For example, a plurality of steps may proceed simultaneously. For example, a plurality of steps may be implemented in reverse order.

Any geometric term herein (such as "parallel" and "perpendicular", for example) should not be interpreted solely in its exact meaning. For example, "parallel" may mean a geometric state that is deviated, to some extent, from exact "parallel". Any geometric term herein may include tolerances and/or errors in terms of design, operation, production, and/or the like. The dimensional relationship in each figure may not necessarily coincide with the actual dimensional relationship. The dimensional relationship (in length, width, thickness, and the like) in each figure may have been changed for the purpose of assisting the understanding of the technique according to the present disclosure. Further, a part of a configuration may have been omitted.

Herein, the expression "in a direction crossing the vertical direction" refers to any direction that is not parallel to the vertical direction. The direction crossing the vertical direction includes the direction perpendicular to the vertical direction (namely, the horizontal direction), for example. The direction crossing the vertical direction may be perpendicular to the rotation axis of each roller.

Herein, a numerical range such as "from 70 to 100%" includes both the upper limit and the lower limit, unless otherwise specified. That is, "from 70 to 100%" means a numerical range of "not less than 70% and not more than 100%". Moreover, any numerical value selected from a certain numerical range may be used as a new upper limit or a new lower limit. For example, any numerical value from a certain numerical range may be combined with any numerical value described in another location of the present specification or in a table or a drawing, for example, to create a new numerical range.

Herein, all the numerical values are regarded as being modified by the term "about". The term "about" may mean±5%, ±3%, ±1%, and/or the like, for example. Each numerical value is an approximate value that can vary depending on the implementation configuration of the technique according to the present disclosure. Each numerical value is expressed in significant figures. Each measured value may be the average value obtained from multiple measurements performed. The number of measurements may be 3 or more, or may be 5 or more, or may be 10 or more. Each measured value may be rounded off based on the number of the significant figures. Each measured value may include an error occurring due to an identification limit of the measurement apparatus, for example.

Herein, "D50 of 100 μm or more" refers to a particle size in mass-based (number-based) particle size distribution at which cumulative frequency of particle sizes accumulated from the small size side reaches 50%. The mass-based particle size distribution may be measured in accordance with "JIS Z 8815 Test sieving—General requirements".

Herein, "D50 less than 100 μm" refers to a particle size in volume-based particle size distribution at which cumulative frequency of particle sizes accumulated from the small size side reaches 50%. The volume-based particle size distribution may be obtained by measurement with a laser-diffraction particle size distribution analyzer.

Herein, "angle of repose" refers to the angle between a horizontal surface and the slope of a cone that is formed when a powdery and granular material falls on the horizontal surface by gravity (namely, the slope of a pile of the powdery and granular material). The angle of repose may be measured with a powder characteristics tester "Powder Tester" manufactured by Hosokawa Micron Corporation, or a similar product.

Herein, when a compound is represented by a stoichiometric composition formula such as "$LiCoO_2$", for example, this stoichiometric composition formula is merely a typical example. Alternatively, the composition ratio may be non-stoichiometric. For example, when lithium cobalt oxide is represented as "$LiCoO_2$", the composition ratio of lithium cobalt oxide is not limited to "Li/Co/O=1/1/2" but Li, Co, and O may be included in any composition ratio, unless otherwise specified. Further, doping with a trace element and/or substitution is also tolerated.

Herein, "melting point" refers to the peak-top temperature for a melting peak (an endothermic peak) of a DSC (Differential Scanning calorimetry) curve. The DSC curve may be measured in accordance with "JIS K 7121 Testing Methods for Transition Temperatures of Plastics". "Near a melting point" may refer to the range of ±20° C. from the melting point, for example.

<Electrode Production Apparatus>

Figure 3:
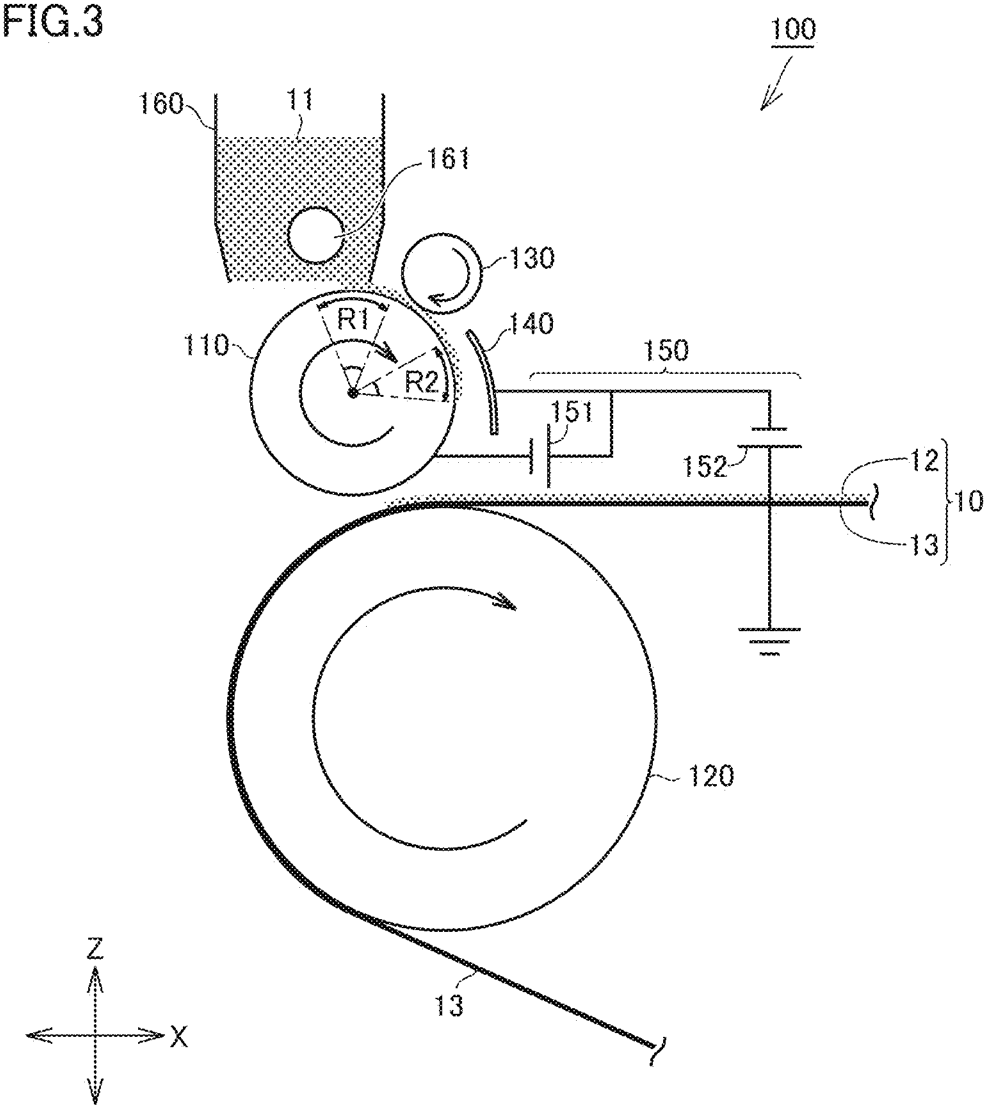
FIG. 3 is a conceptual view illustrating an electrode production apparatus according to the present embodiment.

FIG. 3 is a conceptual view illustrating an electrode production apparatus according to the present embodiment. Hereinafter, "the electrode production apparatus according to the present embodiment" may also be simply called "the present production apparatus". A present production apparatus 100 produces an electrode 10 by making granules 11 adhere to substrate 13.

Present production apparatus 100 includes first roller 110, a relay plate 140, a second roller 120, and an electric-field-forming apparatus 150. Present production apparatus 100 may further include a hopper 160, a third roller 130, and the like, for example.

Present production apparatus 100 may further include a control device (not illustrated) and the like, for example. The control device may control the operation of each member.

Present production apparatus 100 may further include a fixing apparatus (not illustrated) and the like, for example. The fixing apparatus is capable of applying at least one of heat and pressure to an active material layer 12. The fixing apparatus may include a pair of heated rollers, and the like, for example.

Referring to FIG. 3, the rotation axes of the rollers may be substantially parallel to each other. The curved arrow that is seen on each roller shows the direction of the rotation of the roller.

<<Electric-Field-Forming Apparatus>>

Figure 4:
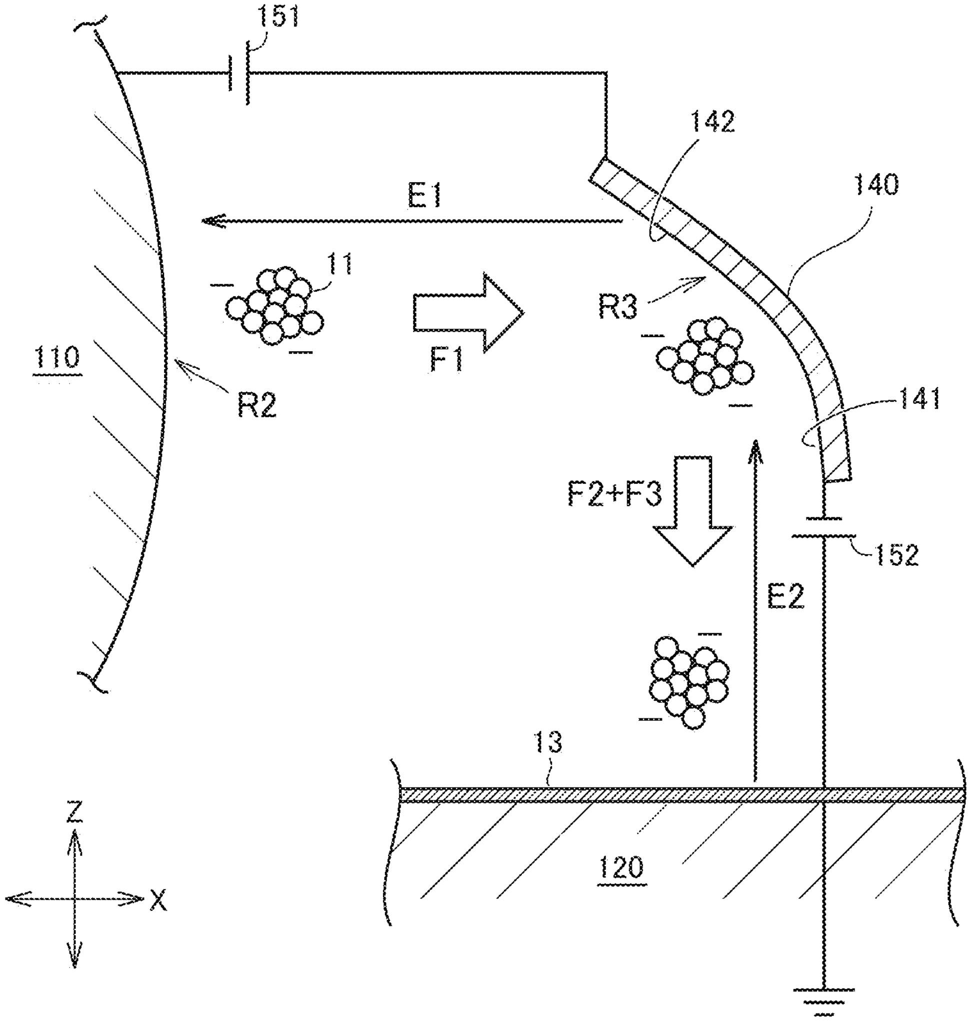
FIG. 4 is a conceptual view illustrating electrostatic coating according to the present embodiment.

FIG. 4 is a conceptual view illustrating electrostatic coating according to the present embodiment. Electric-field-forming apparatus 150 includes a first electric power supply 151 and a second electric power supply 152. Each of first electric power supply 151 and second electric power supply 152 may include a high-voltage electric power supplying apparatus, for example. First electric power supply 151 and second electric power supply 152 may be independent of each other, for example. First electric power supply 151 and second electric power supply 152 may form a single-piece unit, for example.

First electric power supply 151 applies a direct-current voltage (a potential difference) to between first roller 110 and relay plate 140. That is, first electric power supply 151 forms first electric field E1 between first roller 110 and relay plate 140. Second electric power supply 152 applies a direct-current voltage to between relay plate 140 and second roller 120. That is, second electric power supply 152 forms second electric field E2 between relay plate 140 and second roller 120.

In present production apparatus 100, granules 11 may fly across first electric field E1 and then across second electric field E2 to reach substrate 13. Granules 11 adhere to substrate 13, and thereby active material layer 12 may be formed.

<<Hopper>>

Granules 11 may be filled into hopper 160, for example (see FIG. 3). Hopper 160 includes a rotary feeder 161. Rotary feeder 161 may discharge granules 11 at a constant flow rate, for example.

<<First Roller>>

First roller 110 is electrically conductive. First roller 110 may be made of metal, for example. The entire first roller 110 may be electrically conductive. A part of first roller 110 may be electrically conductive. For example, the portion that is in contact with granules 11 may be electrically conductive. For example, the surface layer of first roller 110 may be electrically conductive. First roller 110 is electrically connected to first electric power supply 151.

First roller 110 may also be called "a supply roller", for example. First roller 110 receives granules 11 at first region R1 from hopper 160. By the rotation of first roller 110, granules 11 are transferred in the circumferential direction. Granules 11 are transferred from first region R1 to second region R2.

Second region R2 is positioned lower in the vertical direction than first region R1. Second region R2 is formed in the gap between first roller 110 and relay plate 140. First electric field E1 is formed between first roller 110 and relay plate 140. That is, first roller 110 transfers granules 11 into first electric field E1.

For example, first region R1 may have an arc-like shape. For example, "a clock position" may be defined around the rotation axis of first roller 110. The 6 o'clock direction and the 12 o'clock direction according to the clock position are parallel to the vertical direction (the Z-axis direction). The 3 o'clock direction and the 9 o'clock direction according to the clock position are parallel to the horizontal direction (the X-axis direction). First region R1 may be formed between the 11 o'clock direction and the 1 o'clock direction, for example. First region R1 may be formed between the 12 o'clock direction and the 1 o'clock direction, for example. The sector formed by both edges of first region R1 and the center (the rotation axis) of first roller 110 may have a central angle from 1 to 45°, for example.

Second region R2 faces relay plate 140. The area of second region R2 may be adjusted by changing the size, shape, and the like of relay plate 140, for example. Second region R2 may have an arc-like shape, for example. Second region R2 may be formed between the 2 o'clock direction and the 4 o'clock direction, for example. Second region R2 may be formed between the 2 o'clock direction and the 3 o'clock direction, for example. By these, falling of granules 11 (yield loss) is expected to be reduced, for example. The sector formed by both edges of second region R2 and the center of first roller 110 may have a central angle from 1 to 45°, for example.

<<Third Roller>>

Third roller 130 is interposed between hopper 160 and relay plate 140 (see FIG. 3). Third roller 130 faces first roller 110. Third roller 130 may also be called "a squeegee", for example. In the gap between first roller 110 and third roller 130, granules 11 are spread evenly. By this, variations in the supply amount of granules 11 may be reduced, for example.

The diameter of third roller 130 may be smaller than the diameter of first roller 110, for example. The direction of the rotation of third roller 130 may be opposite to the direction of the rotation of first roller 110, for example. With the direction of the rotation of third roller 130 being opposite to the direction of the rotation of first roller 110, variations in the supply amount of granules 11 (namely, the thickness of the layer of the granules) may be reduced. A squeegee that is not in the form of a roller may also be used. For example, a blade-type squeegee and/or the like may also be used.

<<Relay Plate>>

Relay plate 140 is electrically conductive. Relay plate 140 may be made of metal, for example. The entire relay plate 140 may be electrically conductive. A part of relay plate 140 may be electrically conductive. For example, the surface layer of relay plate 140 may be electrically conductive. Relay plate 140 is electrically connected to first electric power supply 151. Relay plate 140 is also electrically connected to second electric power supply 152 (see FIGS. 3 and 4).

Relay plate 140 is positioned away from first roller 110 in a direction crossing the vertical direction. Relay plate 140 may be positioned away from first roller 110 in the horizontal direction. The gap between relay plate 140 and first roller 110 may be 10 to 50 times greater than the D50 of granules 11, for example. This gap represents the shortest distance between relay plate 140 and first roller 110. The gap between relay plate 140 and first roller 110 may be from 1 to 10 mm, or may be from 2 to 6 mm, for example.

Relay plate 140 includes third region R3 (see FIG. 4). Third region R3 is positioned away from second region R2 in a direction crossing the vertical direction. Third region R3 may be positioned away from second region R2 in the horizontal direction.

Relay plate 140 may have any shape. Relay plate 140 may be flat or may be curved, for example. The surface of relay plate 140 that receives granules 11 may be spherical or may be paraboloid-shaped, for example. The cross section of relay plate 140 that is parallel to the thickness direction of itself (FIGS. 3 and 4) may be curved or bent in a vertically downward direction, for example. In the first electrostatic coating, granules 11 may reach relay plate 140 from multiple directions. When relay plate 140 is curved, for example, granules 11 may adhere to the same or similar position on substrate 13 in the second electrostatic coating. By this, nonuniformity in coating is expected to be reduced, for example.

Relay plate 140 may also be called "a facing plate", for example. Relay plate 140 includes a first facing surface 141 and a second facing surface 142 (see FIG. 4). First facing surface 141 faces first roller 110. First facing surface 141 may extend in the vertical direction. Second facing surface 142 faces second roller 120 (substrate 13). Second facing surface 142 may extend in a direction crossing the vertical direction.

Second facing surface 142 may be contiguous to first facing surface 141. Second facing surface 142 may be separated from first facing surface 141. Second facing surface 142 may be integral to and cannot be differentiated from first facing surface 141. For example, a part of second facing surface 142 may overlap with first facing surface 141. For example, the entire second facing surface 142 may overlap with first facing surface 141. Second facing surface 142 may be substantially the same as first facing surface 141. For example, when relay plate 140 is flat, second facing surface 142 may be substantially the same as first facing surface 141.

<<Second Roller>>

Second roller 120 is electrically conductive. Second roller 120 may be made of metal, for example. The entire second roller 120 may be electrically conductive. A part of second roller 120 may be electrically conductive. For example, the portion that is in contact with substrate 13 may be electrically conductive. For example, the surface layer of second roller 120 may be electrically conductive. The second roller is electrically connected to second electric power supply 152. Second roller 120 may be grounded.

Second roller 120 is positioned lower in the vertical direction than both first roller 110 and relay plate 140 (see FIG. 3). Second roller 120 may be positioned directly below first roller 110, for example. Second roller 120 may be positioned directly below relay plate 140, for example. The diameter of second roller 120 may be larger than the diameter of first roller 110, for example.

The gap between second roller 120 and relay plate 140 may be 20 to 100 times greater than the D50 of granules 11, for example. This gap represents the shortest distance between second roller 120 and relay plate 140. The gap between second roller 120 and relay plate 140 may be from 2 to 20 mm, or may be from 6 to 10 mm, for example.

Second roller 120 may also be called "a backup roller", for example. Second roller 120 supports substrate 13. By the rotation of second roller 120, substrate 13 is transferred. Second roller 120 transfers substrate 13 into second electric field E2. Substrate 13 is positioned lower in the vertical direction than third region R3 (see FIG. 4).

<Method of Producing Electrode>

Figure 5:
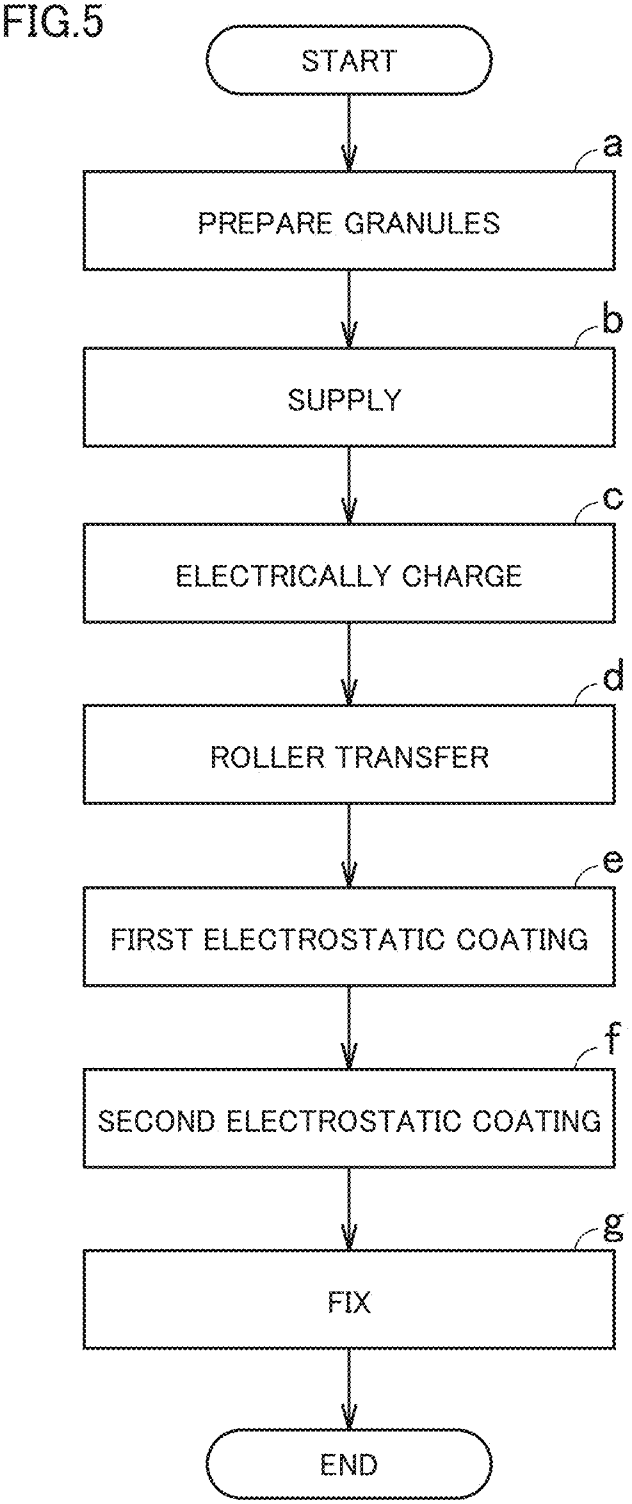
FIG. 5 is a schematic flowchart illustrating a method of producing an electrode according to the present embodiment.

FIG. 5 is a schematic flowchart illustrating a method of producing an electrode according to the present embodiment. Hereinafter, "the method of producing an electrode according to the present embodiment" is simply called "the present production method". The present production method includes "(a) preparing granules", "(b) supplying", "(c) electrically charging", "(d) roller transferring", "(e) first electrostatic coating", and "(f) second electrostatic coating". The present production method may further include "(g) fixing" and the like after "(f) second electrostatic coating", for example. Present production apparatus 100 as described above may implement "(b) supplying" to "(g) fixing", for example.

In the present production method, an electrode for a lithium-ion battery may be produced, for example. However, a lithium-ion battery is merely an example. The present production method may be applied to any battery system. In the present production method, at least one of a positive electrode and a negative electrode may be produced.

<<(a) Preparing Granules>>

The present production method includes preparing granules 11 including an active material powder and a binder. In other words, granules 11 are a precursor of active material layer 12. Granules 11 may be prepared by granulation of powder. Granules 11 include the active material powder and the binder. That is, granules 11 may be prepared by granulation of a mixed powder of the active material powder and the binder. The mixed powder may further include an optional component (such as a conductive material). For example, granules 11 may be prepared by dry granulation, or granules 11 may be prepared by wet granulation. In the present production method, any dry granulator and/or any wet granulation may be used.

Granules 11 are a group of composite particles. One composite particle includes one or more active material particles. One composite particle may include two or more active material particles. One composite particle may include an aggregate of active material particles.

The composite particles may have any shape. The composite particles may be pellets, spherical, flakes, columnar, amorphous, and/or the like, for example. Granules 11 may have a D50 from 50 to 500 μm, for example. Granules 11 may have a D50 from 100 to 200 μm, for example. When granules 11 have a D50 from 100 to 200 μm, granules 11 are expected to have a preferable fluidity, for example.

By granulation, fluidity is expected to be enhanced. The active material powder (before granulation) may have an angle of repose more than 50°, for example. Granules 11 (after granulation) may have an angle of repose of 50° or less, for example. When granules 11 have an angle of repose of 50° or less, nonuniformity in coating is expected to be reduced, for example. Granules 11 may have an angle of repose of 45° or less, for example. Granules 11 may have an angle of repose of 30° or more, for example.

<Active Material Powder>

The active material powder includes an active material particle. The active material powder is a group of active material particles. For example, the active material powder may have a D50 from 1 to 30 μm, or may have a D50 from 1 to 20 μm, or may have a D50 from 1 to 10 μm.

The active material particle causes electrode reaction. The active material particle may include an optional component. The active material particle may include a positive electrode active material, for example. The active material particle may include, for example, at least one selected from the group consisting of $LiCoO_2$, $LiNiO_2$, $LiMnO_2$, $LiMn_2O_4$, $Li(NiCoMn)O_2$, $Li(NiCoAl)O_2$, and $LiFePO_4$. "(NiCoMn)" in "$Li(NiCoMn)O_2$", for example, means that the constituents within the parentheses are collectively regarded as a single unit in the entire composition ratio. As long as (NiCoMn) is collectively regarded as a single unit in the entire composition ratio, the amounts of individual constituents are not particularly limited. $Li(NiCoMn)O_2$ may include $Li(Ni_{1/3}Co_{1/3}Mn_{1/3})O_2$, $Li(Ni_{0.5}Co_{0.2}Mn_{0.3})O_2$, $Li(Ni_{0.8}Co_{0.1}Mn_{0.1})O_2$, and/or the like, for example.

The active material particle may include a negative electrode active material, for example. The active material particle may include, for example, at least one selected from the group consisting of graphite, soft carbon, hard carbon, silicon, silicon oxide, silicon-based alloy, tin, tin oxide, tin-based alloy, and $Li_4Ti_5O_{12}$.

<Binder>

The binder may be in powder form. The binder may bond a solid material to another solid material in active material layer 12. The amount of the binder to be used may be, for example, from 0.1 to 10 parts by mass relative to 100 parts by mass of the active material powder. The binder may include an optional component. The binder may include, for example, at least one selected from the group consisting of polyvinylidene difluoride (PVdF), polytetrafluoroethylene (PTFE), vinylidene difluoride-hexafluoropropylene copolymer (PVdF-HFP), styrene-butadiene rubber (SBR), carboxymethylcellulose (CMC), polyimide (PI), polyamide-imide (PAI), and polyacrylic acid (PAA).

<Optional Component>

Granules 11 may further include a conductive material, for example. The conductive material may be in powder form. The conductive material may form an electron conduction path in active material layer 12. The amount of the conductive material to be used may be, for example, from 0.1 to 10 parts by mass relative to 100 parts by mass of the active material powder. The conductive material may include an optional component. The conductive material may include a conductive carbon particle, a conductive carbon fiber, and/or the like, for example. The conductive material may include, for example, at least one selected from the group consisting of carbon black, vapor grown carbon fiber, carbon nanotube, and graphene flake. The carbon black may include, for example, at least one selected from the group consisting of acetylene black, furnace black, channel black, and thermal black.

Granules 11 may further include a solvent, for example. The solvent is liquid. The solvent may be dispersed as liquid drops in granules 11. For example, the binder may absorb the solvent and be swollen. The solvent may include an optional component. The solvent may include, for example, at least one selected from the group consisting of water, N-methyl-2-pyrrolidone (NMP), and butyl butyrate. Granules 11 may have a solid fraction from 70 to 100%, or may have a solid fraction from 80 to 100%, or may have a solid fraction from 90 to 100%, for example.

Granules 11 may further include a solid electrolyte, for example. That is, in the present production method, electrode 10 for an all-solid-state battery may also be produced. The solid electrolyte may be in powder form. The solid electrolyte may form an ion conduction path in active material layer 12. The solid electrolyte may include an optional component. The solid electrolyte may include, for example, at least one selected from the group consisting of $Li_2S—P_2S_5$, $LiI—Li_2S—P_2S_5$, $LiBr—Li_2S—P_2S_5$, and $LiI—LiBr—Li_2S—P_2S_5$.

<<(b) Supplying>>

The present production method includes supplying granules 11 onto a surface of first roller 110 (see FIG. 3). For example, granules 11 may be filled into hopper 160. Rotary feeder 161 may discharge granules 11 onto first region R1 at a constant flow rate, for example.

<<(c) Electrically Charging>>

The present production method includes electrically charging the granules 11. In FIG. 5, for the sake of convenience, "(c) ELECTRICALLY CHARGE" is seen between "(b) SUPPLY" and "(d) ROLLER TRANSFER". However, "(c) ELECTRICALLY CHARGE" may be implemented at any timing between "(a) PREPARE GRANULES" and "(e) FIRST ELECTROSTATIC COATING". For example, "(c) ELECTRICALLY CHARGE" and "(d) ROLLER TRANSFER" may be implemented at the same time.

For example, first electric power supply 151 may supply an electric charge (electrons) to first roller 110. For example, first roller 110 may inject an electric charge into granules 11 (see FIG. 3). By this, granules 11 may become negatively charged.

<<(d) Roller Transferring>>

The present production method includes transferring granules 11 from first region R1 to second region R2 by way of rotation of first roller 110 (see FIG. 3). Second region R2 is positioned lower in the vertical direction than first region R1. Second region R2 is positioned within first electric field E1 (see FIG. 4).

Granules 11 may be spread evenly on the surface of first roller 110 before granules 11 reach first electric field E1 (second region R2). For example, granules 11 may be spread evenly in the gap between first roller 110 and third roller 130. By this, a constant amount of granules 11 is expected to be supplied to first electric field E1.

<<(e) First Electrostatic Coating>>

The present production method includes forming first electric field E1 between second region R2 and third region R3 to allow granules 11 to fly from second region R2 toward third region R3 (see FIG. 4).

For example, first electric power supply 151 may apply a direct-current voltage to between first roller 110 and relay plate 140. By this, first electric field E1 may be formed between second region R2 and third region R3. Granules 11 that are supplied to second region R2 may receive the action of first electrostatic force F1. Due to first electrostatic force F1, granules 11 may leave first roller 110 and fly toward relay plate 140.

<<(f) Second Electrostatic Coating>>

The present production method includes forming second electric field E2 between third region R3 and substrate 13 to allow granules 11 to fly from third region R3 toward substrate 13 (see FIG. 4). After reaching substrate 13, granules 11 may adhere to substrate 13. By this, active material layer 12 may be formed; that is, electrode 10 may be produced.

For example, second electric power supply 152 may apply a direct-current voltage to between relay plate 140 and second roller 120. By this, second electric field E2 may be formed between third region R3 and substrate 13. Granules 11 adhering to relay plate 140 may receive the action of second electrostatic force F2. Further, granules 11 may also receive the action of gravity F3. By the combination of second electrostatic force F2 and gravity F3, granules 11 may leave relay plate 140 and fly toward substrate 13. By the combination of second electrostatic force F2 and gravity F3, granules 11 are expected to firmly adhere to substrate 13.

<Substrate>

Substrate 13 may have a sheet-like shape, for example. Substrate 13 may have a belt-like shape, for example. Substrate 13 is electrically conductive. Substrate 13 may be a current collector. Substrate 13 may include a metal foil, for example. Substrate 13 may include, for example, at least one selected from the group consisting of aluminum (Al) foil, Al alloy foil, copper (Cu) foil, Cu alloy foil, nickel (Ni) foil, Ni alloy foil, titanium (Ti) foil, and Ti alloy foil. Substrate 13 may have a thickness from 5 to 50 μm, or may have a thickness from 5 to 20 μm, for example.

<Electric Field Strength>

The electrostatic force may be adjusted by changing electric field strength. First electric field E1 has a first electric field strength. Second electric field E2 has a second electric field strength. In first electric field E1, first electrostatic force F1 acts on granules 11. In second electric field E2, not only second electrostatic force F2 but also gravity F3 act on granules 11. Therefore, the second electric field strength may be smaller than the first electric field strength, for example.

The first electric field strength may be calculated by dividing the direct-current voltage applied to between first roller 110 and relay plate 140 by the gap between first roller 110 and relay plate 140 (the shortest distance). When the first electric field strength is too low, granules 11 may not fly. When the first electric field strength is too high, the impact at the time of collision of granules 11 with relay plate 140 may be too great. Due to the rebound of the collision, granules 11 may bounce back from relay plate 140. The first electric field strength may be from 75000 to 300000 V/m, or may be from 100000 to 200000 V/m, for example.

The second electric field strength may be calculated by dividing the direct-current voltage applied to between relay plate 140 and second roller 120 by the gap between relay plate 140 and second roller 120 (the shortest distance). When the second electric field strength is too low, granules 11 may not adhere to substrate 13. When the second electric field strength is too high, the impact at the time of collision of granules 11 with substrate 13 may be too great. Due to the rebound of the collision, granules 11 may bounce back from substrate 13. The second electric field strength may be from 37500 to 150000 V/m, or may be from 50000 to 100000 V/m, for example.

<<(g) Fixing>>

The present production method may include fixing active material layer 12 to substrate 13 by applying at least one of pressure and heat to active material layer 12. Fixing active material layer 12 is expected to enhance the peel strength of active material layer 12, for example.

The pressure and the heat may be separately applied. The pressure and the heat may be applied substantially at the same time. For example, active material layer 12 may be compressed with a heated roller, a heated plate, and/or the like. The temperature for heating active material layer 12 may be a temperature near the melting point of the binder, for example. Due to the softening, melting, and re-solidifying of the binder, the fixing force is expected to be enhanced. The heating temperature may be from 80 to 200° C., or may be from 120 to 200° C., or may be from 140 to 180° C., for example.

The pressure may be adjusted depending on the target thickness, target density, and/or the like of active material layer 12, for example. A pressure from 50 to 200 MPa may be applied to active material layer 12, for example.

<<Other>>

In the above manner, electrode 10 may be produced. When active material layer 12 (granules 11) includes a solvent, electrode 10 may be dried. According to the battery design, the electrode may be cut into a predetermined planar shape.

<Electrode>

Figure 6:
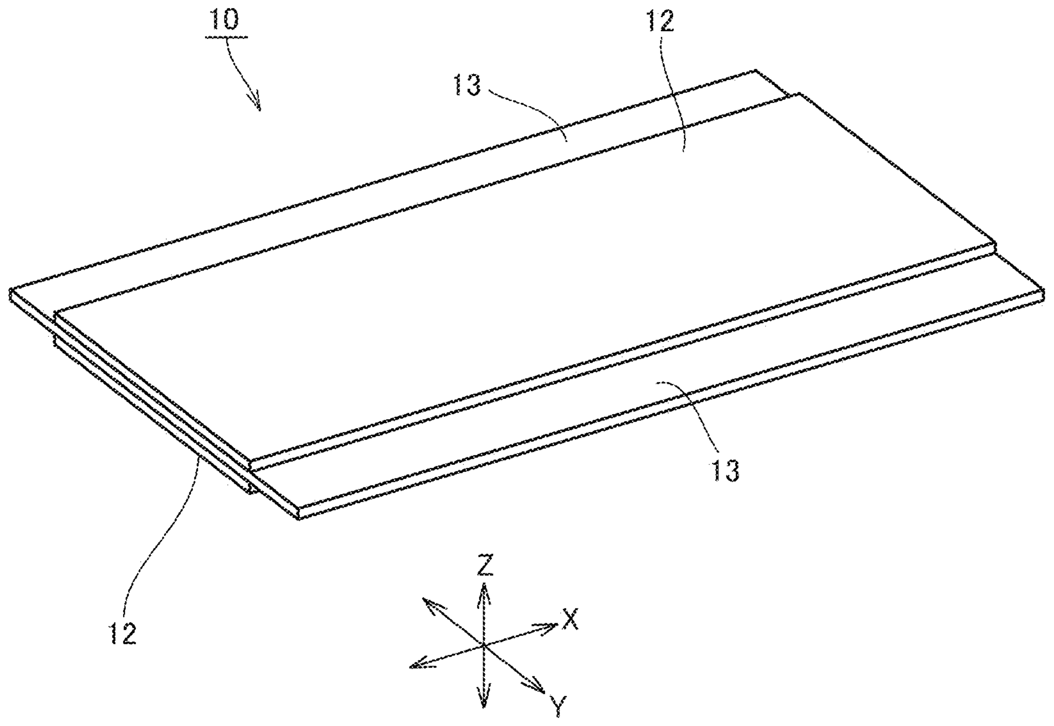
FIG. 6 is a conceptual view of an example of an electrode.

FIG. 6 is a conceptual view of an example of an electrode. Electrode 10 may be a positive electrode or may be a negative electrode. Electrode 10 may have any outer profile depending on the battery design. Electrode 10 may have a belt-like shape, for example. Electrode 10 includes substrate 13 and active material layer 12. Active material layer 12 is placed on a surface of substrate 13. Active material layer 12 may be placed on only one side of substrate 13. Active material layer 12 may be placed on both sides of substrate 13.

Active material layer 12 may have any thickness. Active material layer 12 may have a thickness from 10 to 500 μm, or may have a thickness from 50 to 200 μm, for example. When electrode 10 is a positive electrode, active material layer 12 may have a density from 2 to 4 g/cm$^3$, for example. When electrode 10 is a negative electrode, active material layer 12 may have a density from 1 to 2 g/cm$^3$, for example. The density of active material layer 12 refers to "an apparent density". The apparent density is calculated by dividing the mass of active material layer 12 by the apparent volume of active material layer 12. The apparent volume includes the volume of pores.

For example, active material layer 12 may include the binder in a mass fraction from 1 to 10% and the conductive material in a mass fraction from 0 to 10%, with the remainder being made up of the active material powder. The active material powder may include a positive electrode active material, or may include a negative electrode active material.

EXAMPLES

<Producing Electrode>

Next, the present example is described. In a first production example, a positive electrode was produced. In a second production example, a negative electrode was produced.

First Production Example

The below materials were prepared.

Active material powder: Li(NiCoMn)$O_2$

Conductive material: acetylene black

Binder: PVdF

Substrate 13: Al foil (thickness, 12 μm)

A mixing apparatus "High Speed Mixer" manufactured by Earthtechnica Co., Ltd. was prepared. Into the mixing tank of the mixing apparatus, the active material powder, the conductive material, and the binder were added. The blending ratio of the materials was "(active material powder)/(conductive material)/binder=90/5/5 (mass ratio)". The number of revolutions of the stirring blade was set at 4500 rpm. The materials were mixed for 1 minute. Thus, a mixed powder was prepared. The mixed powder had an angle of repose of 59.6°.

A dry granulator was prepared. With the dry granulator, the mixed powder was granulated. Thus, granules 11 were prepared. The individual composite particles constituting granules 11 were shaped into flakes. Granules 11 were subjected to sizing through a 16-mesh metal mesh. After sizing, granules 11 had a D50 from 100 to 200 μm. After sizing, granules 11 had an angle of repose of 42.1°.

The electrode production apparatus according to FIGS. 4 and 5 was prepared. Details of its parts were as follows.

First electric field E1: first roller 110 (−1200 V), relay plate 140 (−600 V)

Gap between first roller 110 and relay plate 140: 4 mm

First electric field strength: 150000 V/m

Second electric field E2: relay plate 140 (−600 V), second roller 120 (0 V, GND)

Gap between relay plate 140 and second roller 120: 8 mm

Second electric field strength: 75000 V/m

From hopper 160 onto the surface of first roller 110, granules 11 were supplied. Granules 11 received electric charge injection from first roller 110, and thereby granules 11 became electrically charged. By way of rotation of first roller 110, granules 11 were transferred from first region R1 to second region R2. Granules 11 flied across first electric field E1 and then across second electric field E2, and thereby granules 11 adhered to substrate 13. By this, active material layer 12 was formed; that is, electrode 10 was produced. Active material layer 12 had planar dimensions of 60 mm×200 mm.

Electrode 10 was sandwiched between two heated plates (flat plates). The temperature of the heated plates was 160° C. By these heated plates, a load of 15 tf was applied to active material layer 12 for 30 seconds. By this, active material layer 12 was fixed to substrate 13.

Second Production Example

The below materials were prepared.

Active material powder: amorphous-carbon-coated graphite

Binder: PVdF

Substrate 13: Cu foil (thickness, 8 μm)

With regard to the amorphous-carbon-coated graphite, the surface of each graphite particle was coated with an amorphous carbon material. A mixing apparatus "High Speed Mixer" manufactured by Earthtechnica Co., Ltd. was prepared. Into the mixing tank of the mixing apparatus, the active material powder and the binder were added. The blending ratio of the materials was "(active material powder)/binder=97.5/2.5 (mass ratio)". The number of revolutions of the stirring blade was set at 4500 rpm. The materials were mixed for 1 minute. By this, a mixed powder was prepared. The mixed powder had an angle of repose of 49.7°.

The mixed powder was granulated with a dry granulator. By this, granules 11 were prepared. The individual composite particles constituting granules 11 were shaped into flakes. Granules 11 were subjected to sizing through a 16-mesh metal mesh. After sizing, granules 11 had a D50 from 100 to 200 μm. After sizing, granules 11 had an angle of repose of 44.3°. Except these, the same procedure as in the first production example was carried out to produce electrode 10.

<Production Results>

Figure 7:
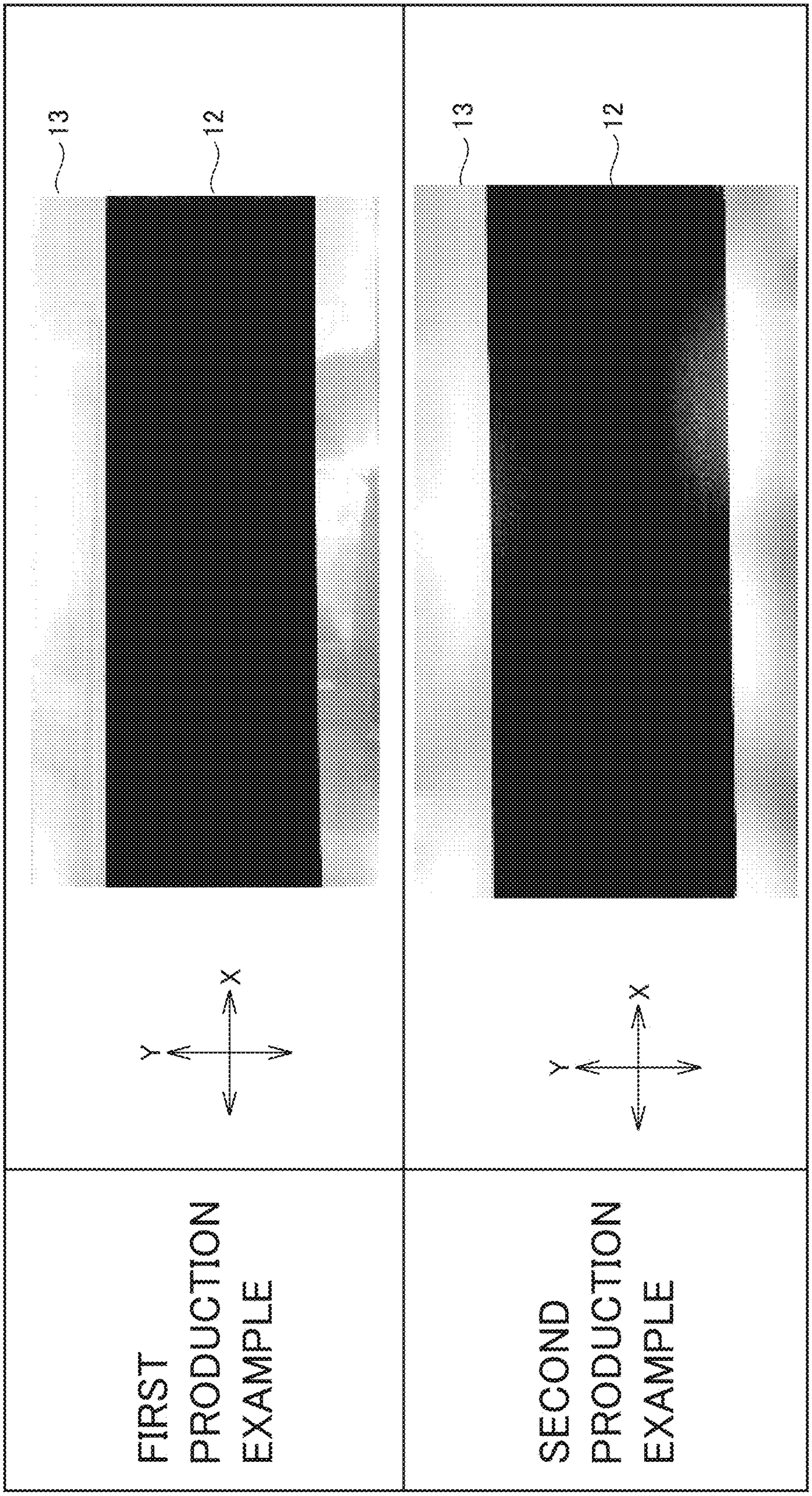
FIG. 7 shows photographs of production results of a first production example and a second production example.

FIG. 7 shows photographs of production results of the first production example and the second production example. In the first production example and the second production example, nonuniform coating was not observed for active material layer 12. Moreover, in the first production example and the second production example, the entire amount of the granules 11 added was used for forming active material layer 12. That is, no substantial yield loss occurred.

The present embodiment and the present example are illustrative in any respect. The present embodiment and the present example are non-restrictive. The technical scope of the present disclosure encompasses any modifications within the meaning and the scope equivalent to the terms of the claims. For example, it is expected that certain configurations of the present embodiments and the present examples can be optionally combined.

What is claimed is:

1. A method of producing an electrode, comprising:

(a) preparing granules, the granules including an active material powder and a binder;

(b) supplying the granules onto a surface of a roller;

(c) electrically charging the granules;

(d) transferring the granules from a first region to a second region by way of rotation of the roller;

(e) forming a first electric field between the second region and a third region to allow the granules to fly from the second region toward the third region wherein a curved relay plate is disposed in the third region; and (f) forming a second electric field between the third region and a substrate to allow the granules to fly from the third region toward the substrate, without penetrating the curved relay plate wherein the second region is positioned lower in a vertical direction than the first region, the third region is positioned away from the second region in a direction crossing the vertical direction, the substrate is positioned lower in the vertical direction than the third region, and the granules adhere to the substrate and thereby an active material layer is formed, wherein:

in a cross-section perpendicular to an axis of the roller, each o'clock direction is located relative to a center position and the center position is located in a center of the roller, and when a 6 o'clock direction or a 12 o'clock direction is the vertical direction and the second region is disposed between a 2 o'clock direction and a 4 o'clock direction relative to the center position, the third region is disposed away from the second region in a horizontal direction crossing the vertical direction.

2. The method of producing an electrode according to claim 1, wherein the granules have a solid fraction from 70 to 100% by mass.

3. The method of producing an electrode according to claim 1, wherein the granules have a D50 from 100 to 200 μm.

4. The method of producing an electrode according to claim 1, wherein the granules have an angle of repose of 50° or less.

5. The method of producing an electrode according to claim 1, wherein the first electric field has a first electric field strength, the second electric field has a second electric field strength, and the second electric field strength is smaller than the first electric field strength.

6. The method of producing an electrode according to claim 1, wherein (d) includes spreading the granules evenly on the surface of the roller.

7. The method of producing an electrode according to claim 1, further comprising:

(g) fixing the active material layer to the substrate by applying at least one of pressure and heat to the active material layer.

* * * * *